United States Patent
Padmalata et al.

(10) Patent No.: US 9,128,640 B2
(45) Date of Patent: Sep. 8, 2015

(54) SOFTWARE PRODUCT CONSISTENCY ASSESSMENT

(71) Applicant: Tata Consultancy Services Limited, Mumbai (IN)

(72) Inventors: Nistala Venkata Padmalata, Madhapur (IN); Priyanka Kumari, Madhapur (IN); Narayan Guru Prasada Lakshmi Mandaleeka, Madhapur (IN)

(73) Assignee: Tata Consultancy Services Limited (IN)

( * ) Notice: Subject to any disclaimer, the term of this patent is extended or adjusted under 35 U.S.C. 154(b) by 16 days.

(21) Appl. No.: 13/893,824

(22) Filed: May 14, 2013

(65) Prior Publication Data

US 2014/0344774 A1    Nov. 20, 2014

(51) Int. Cl.
- *G06F 9/44* (2006.01)
- *G06F 9/445* (2006.01)
- *G06F 11/36* (2006.01)
- *G06Q 10/06* (2012.01)

(52) U.S. Cl.
CPC .. *G06F 8/10* (2013.01); *G06F 8/70* (2013.01); *G06F 9/44589* (2013.01); *G06F 11/3604* (2013.01); *G06F 11/3608* (2013.01); *G06Q 10/0633* (2013.01)

(58) Field of Classification Search
CPC .............. G06F 8/10; G06F 8/70–8/78; G06F 9/44589; G06F 11/3604–11/3616
See application file for complete search history.

(56) References Cited

U.S. PATENT DOCUMENTS

| | | | |
|---|---|---|---|
| 8,321,850 B2 * | 11/2012 | Bruening et al. | 717/151 |
| 8,543,985 B2 * | 9/2013 | Kahlon | 717/126 |
| 8,656,365 B2 * | 2/2014 | Rama et al. | 717/126 |
| 8,762,929 B2 * | 6/2014 | Driesen | 717/100 |
| 2008/0256505 A1 * | 10/2008 | Chaar et al. | 717/100 |
| 2009/0300577 A1 * | 12/2009 | Bernardini et al. | 717/101 |
| 2010/0023920 A1 * | 1/2010 | Chaar et al. | 717/102 |
| 2011/0010693 A1 * | 1/2011 | Kahlon | 717/133 |
| 2012/0159421 A1 * | 6/2012 | Driesen | 717/101 |
| 2013/0061211 A1 * | 3/2013 | Rama et al. | 717/126 |
| 2014/0344774 A1 * | 11/2014 | Padmalata et al. | 717/101 |

OTHER PUBLICATIONS

Bosch, Jan, et al., "Variability Issues in Software Product Lines", 2002, pp. 13-21.*

(Continued)

*Primary Examiner* — Thuy Dao
*Assistant Examiner* — Christopher Franco
(74) *Attorney, Agent, or Firm* — Schwegman Lundberg & Woessner, P.A.

(57) ABSTRACT

A consistency assessment system for assessment of consistency of a software product includes a mapping module to obtain a plurality of configuration elements associated with the software product being developed, where each of the plurality of configuration elements influence software product development. Each of the plurality of configuration elements pertains to one of a plurality of element categories influencing software product development. The mapping module further identifies based on one or more identifiers, association of at least one configuration element from among the plurality of configuration elements with at least one another configuration element from among the plurality of configuration elements. Upon identification, an assessing module determines a requirement consistency index (RCI) for assessment of consistency of the software product. The RCI indicates an overall consistency of the software product.

10 Claims, 5 Drawing Sheets

(56) References Cited

OTHER PUBLICATIONS

Metzger, Andreas, et al., Disambiguating the Documentation of Variability in Software Product Lines: A Separation of Concerns, Formalization and Automated Analysis, 2007, pp. 243-253.*

Alferez, Mauricio, et al., "Supporting Consistency Checking between Features and Software Product Line Use Scenarios", 2011, pp. 20-35.*

Satyananda, Tonny Kurniadi, et al., "Formal Verification of Consistency between Feature Model and Software Architecture in Software Product Line", 2007, pp. 1-6.*

Heidenreich, Georg, et al., "A New Approach to Consistency Control in Software Engineering", 1996, pp. 289-297.*

Tekinerdogan, Bedir, et al., "Architecture Conformance Analysis Approach within the Context of Multiple Product Line Engineering", 2014, pp. 25-28.*

* cited by examiner

SOFTWARE PRODUCT CONSISTENCY ASSESSMENT

TECHNICAL FIELD

The present subject matter, in general, relates to development of software products, and in particular, to assessment of consistency of a software product.

BACKGROUND

With the increasing use of technology, software products have replaced tedious human labour in almost all avenues. For example, software products are developed and implemented for carrying out monetary transactions, accounting, travel booking, hotel management, cab management, and a plethora of other such purposes.

Generally, software products are tested to ensure that the software performs the functions it is designed for. Software products are tested for functionality, bugs, and glitches in order to determine whether the software products meet required goals or not. Goals and objectives of the software products may be realized by defining product requirements associated with the software products. On the basis of the product requirements, the software product is engineered with reference to design, and architecture and the software product is developed. Further, to elicit the product requirements for the software product to be developed, various models and frameworks have been developed. Such frameworks and models facilitate in identifying the product requirements applicable for the software products.

BRIEF DESCRIPTION OF DRAWINGS

The detailed description is described with reference to the accompanying figures. In the figures, the left-most digit(s) of a reference number identifies the figure in which the reference number first appears. The same numbers are used throughout the drawings to reference like features and components.

DETAILED DESCRIPTION

Figure 1A:
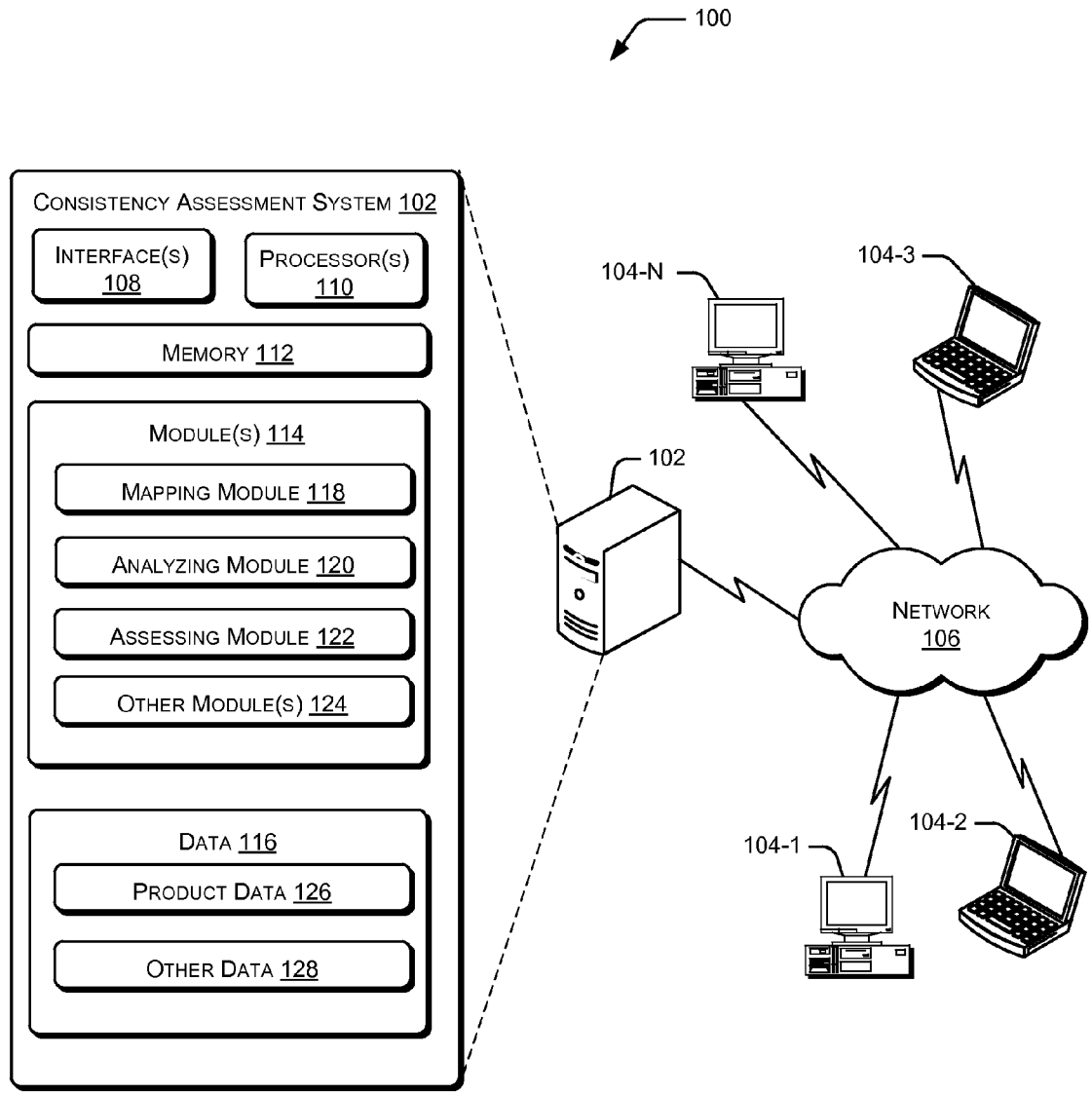
FIG. 1a illustrates a network environment implementation of a consistency assessment system, in accordance with an embodiment of the present subject matter.

Typically, during software product development, product requirements of the software product are defined during an initial phase of the software development lifecycle. The product requirements usually describe various functionalities of the software product to achieve a business objective, based on which the software product is developed. Conventionally, various models and frameworks have been developed as an attempt for eliciting the product requirements for a software product to be developed. However, product requirements of a software product may not be explicitly and appropriately defined by these frameworks and models. In such a scenario, it becomes difficult to ensure that the software product that is being designed and developed will meet the underlying business objective of the software product.

Further, the conventional frameworks and models do not take into account certain parameters associated with the product requirements, such as business goals, business objectives, and business processes, during the initial phases of development of the software product. As a result, the development decisions and overall quality of the software product can be adversely affected. Furthermore, in a case when the product requirements and parameters associated with them are taken into account, these may be elicited by different users, such as a client for whom the software product is being developed and as a developer who is responsible for developing the software product. In such a case, the association and interaction between the requirements and other parameters may not be appropriately captured in the conventional frameworks, since different parameters are received from disjunctive sources.

Therefore, many conventionally developed software products are found to lack certain requirements either at the time of testing or during deployment and operation in the production environment, leading to inadequacies. Further, for rectifying the issues with the software product, re-designing, modifications, and re-testing of the software product may be done post development. Such processes may be time consuming and resource intensive, and may considerably affect the cost of development and designing of the software product.

The present subject matter describes systems and methods for assessment of consistency of a software product. The system as described herein, referred to as consistency assessment system, is capable of assessing the consistency of a software product, for example, with reference to the requirements of the software product. In an implementation, the consistency assessment system determines the consistency of the software to be developed in a requirements analysis phase or subsequent phases prior to development, of the development lifecycle of the software product. As will be understood, the requirements analysis phase may encompass those tasks that go into determining needs or conditions to meet the requirements for the software product being developed. In addition, the software product requirements describe various functionalities of the software product to achieve a business objective, based on which the software product is developed.

In an implementation of the present subject matter, configuration elements associated with a software product are obtained during a requirements analysis phase of the software product. The configuration elements pertain to a plurality of element categories. Thereafter, association of the configuration elements with other configuration elements is identified based on one or more identifiers. Based on the association, a requirement consistency index (RCI) is determined for assessment of consistency of the software product. The RCI is indicative of an overall consistency of the software product. Further, the software product is developed based on the RCI.

In an implementation, a plurality of element categories associated with software products are defined for the software product to be developed. The element categories may include, but are not limited to, a 'Goals and Objectives' category, a 'Process and Sub-Process' category, a 'Requirement' category, and a 'Use Case' category. In one example, the plurality of element categories may be defined by a developer who is responsible for developing the software product, interchangeably referred to as product.

Further, for each of the element categories, one or more configuration elements associated with the software product are obtained. The configuration elements may be understood as the elements related to the element categories. In an example, the configuration elements are obtained during the requirements analysis phase of product development. Considering, for example, a software product that relates to customer license management, customers get enrolled when they buy the software product. For example, for the 'Goals and Objectives' category, the configuration elements can include say, an enrollment element according to which users should be automatically enrolled at a point when they initiate a new process. Accordingly, in said example, the configuration elements for the 'Process and Sub-Process' category relating to the abovementioned configuration element in the 'Goals and Objectives' category of the software product, can include an automatic registration element and a bulk registration element, when the users are buying the product.

Further, each process may be divided into one or more sub-processes. Accordingly, in the above example, the configuration elements related to the sub-processes of the process configuration elements of bulk registration element can include elements, such as bulk registration for product users, and bulk member load registration for workplace users. Furthermore, in said example, for the 'Requirement' category, the configuration elements can include configuration elements pertaining to requirements of the software product, such as identifying whether the user is already registered or not. Similarly, the 'Use Case' category can include the configuration elements say, activation code generation element.

According to an implementation, along with the configuration elements, a plurality of identifiers may be obtained from a user, each of the plurality of identifiers being indicative of an association between the configuration elements. For instance, one or more identifiers can be associated with each configuration element, to indicate the association or dependence of that configuration element with other configuration elements belonging to the same element category as well as different element categories. In an example, the user may be a client for whom the software product is being developed as well as a developer who is responsible for developing the software product.

Once the configuration elements and the respective identifiers have been obtained, a configuration structure is generated by mapping the configuration elements of one element category to other configuration elements of another element category based on the identifiers. For instance, the mapping of the configuration elements can be achieved by linking the configuration elements in both forward and backward direction. For example, based on the identifiers, links between configuration elements of the 'Process and Sub-Process' category and configuration elements of the 'Goals and Objectives' category and the 'Requirements' category may be established. In said example, the identifiers may determine processes and sub-processes to be performed to achieve the particular goal of the software product, the requirements relevant to the determined processes and sub-processes for the software product, and the use cases for analyzing the processes, sub-processes, and requirements.

In addition, the configuration structure can also include configuration elements of the same category mapped to each other based on the identifiers, in addition to being mapped to configuration elements of other categories. In an example, the identifiers may establish link between configuration elements of the 'Goals and Objectives' category. In said example, the identifier may facilitate linkages between the goals to be met for the software product and the objectives corresponding to respective goals.

Upon generation of the configuration structure, the configuration structure is analyzed to determine inconsistencies between the configuration elements associated with the software product. In an example, the inconsistencies may be understood as missing linkages in the configuration structure, i.e., missing links between various configuration elements in different element categories in the configuration structure. In said example, in case the configuration elements are not appropriately defined with respect to the software product development, the linkages between the configuration elements may be missing, indicating an inconsistency.

In an example, the configuration structure is analyzed to determine inconsistencies in requirements defined for the software product. According to said example, as poorly and inappropriately defined requirements threaten overall success of the software product, inconsistencies in the requirements are determined during the requirements analysis phase of the software product in accordance with the present subject matter. Therefore, according to the present subject matter, the inconsistencies in the requirements are found out in initial stages, irrespective of whether other elements are properly defined or not, and the software product can be successfully developed.

In an implementation, while analyzing the configuration structure, the inconsistencies in the configuration structure may be determined based on a traceability analysis. In an example, the traceability analysis can include checking whether each configuration element is mapped with another configuration element in both forward and backward directions. Accordingly, if a configuration element is not mapped with a corresponding configuration element either in one or both the directions, then the configuration element is determined to be inconsistent.

Further, in said implementation, the inconsistencies may also be determined based on a conservation analysis of the configuration structure, for example, in cases where the configuration elements are mapped hierarchically. For instance, for two directly mapped configuration elements, it may be determined whether the configuration element connected in the forward direction correctly achieves a purpose of the other configuration element. If not, then the configuration element connected in the forward direction is determined to be inconsistent.

Further, in an implementation, based on the analysis of the configuration structure and the inconsistency in the requirements, a requirement inconsistency matrix (RIM) can be determined which is indicative of total inconsistencies of the configuration elements in the configuration structure.

Further, based on the configuration structure, consistency value for each of the configuration elements is evaluated. In an example, if for a configuration element, both the traceability and conservation is maintained then the consistency value of the configuration element may be 1. On the contrary, if one of or both the traceability and conservation are not maintained, then the consistency value for the configuration element may be 0.

According to an implementation, based upon determination of the RIM and evaluation of the consistency values, the consistency of the software product can be determined For instance, a requirement consistency index can be determined based on the consistency values of the configuration elements. The requirement consistency index can be indicative of an overall requirement consistency of the software product. Accordingly, the requirement consistency index can be employed to assess the consistency of the software product, the consistencies of the configuration elements, and the software product can be developed based on the same.

Since the product requirements and others parameters associated with the product requirements, such as business goals and product specification, are explicitly defined and considered before development of the software product, the product does not undergo any modification after the development. As a result, the cost associated with product development is significantly mitigated. Also, the association and interaction between the configuration elements are appropriately captured based on the identifiers. Therefore, inconsistencies between the configuration elements can be easily determined and the software product can be developed accordingly.

The present subject matter thus provides a framework implemented by the consistency assessment system to capture, analyze, and refine requirements of software products to be developed for efficient development of software products of better quality. Thus, the consistency assessment system as described herein makes software product development efficient in terms of cost, resources and time used, and also increases the reliability of the software product developed based on the consistency assessment.

FIG. 1a illustrates a network environment 100 implementing a consistency assessment system 102, in accordance with an embodiment of the present subject matter. In said embodiment, the network environment 100 includes the consistency assessment system 102 for assessing consistency of requirements of a software product during its requirements analysis phase. The requirements may be understood as needs or conditions to be met for the software product being developed.

In one implementation, the network environment 100 can be a public network environment, including thousands of personal computers, laptops, various servers, such as blade servers, and other computing devices. In another implementation, the network environment 100 can be a private network environment with a limited number of computing devices, such as personal computers, servers, laptops, and/or communication devices, such as mobile phones and smart phones.

The consistency assessment system 102 may be implemented in a variety of computing systems, such as a laptop computer, a desktop computer, a notebook, a workstation, a mainframe computer, a server, a network server, and the like. In one implementation, the consistency assessment system 102 may be included within an existing information technology infrastructure or a database management structure. Further, it will be understood that the consistency assessment system 102 may be connected to a plurality of user devices 104-1, 104-2, 104-3, . . . , 104-N, collectively referred to as user devices 104 and individually referred to as a user device 104. The user device 104 may include, but is not limited to, a desktop computer, a portable computer, a mobile phone, a handheld device, and a workstation. The user devices 104 may be used by users, such as database analysts, programmers, developers, data architects, software architects, module leaders, projects leaders, clients or customers, and the like.

As shown in FIG. 1a, the user devices 104 are communicatively coupled to the consistency assessment system 102 over a network 106 through one or more communication links for facilitating one or more end users to access and operate the consistency assessment system 102. In one implementation, the network 106 may be a wireless network, a wired network, or a combination thereof. The network 106 may also be an individual network or a collection of many such individual networks, interconnected with each other and functioning as a single large network, e.g., the Internet or an intranet. The network 106 may be implemented as one of the different types of networks, such as intranet, local area network (LAN), wide area network (WAN), the internet, and such. The network 106 may either be a dedicated network or a shared network, which represents an association of the different types of networks that use a variety of protocols, for example, Hypertext Transfer Protocol (HTTP), Transmission Control Protocol/Internet Protocol (TCP/IP), etc., to communicate with each other. Further, the network 106 may include a variety of network devices, including routers, bridges, servers, computing devices, storage devices, and the like.

The consistency assessment system 102 further includes interface(s) 108. Further, the interface(s) 108 may include a variety of software and hardware interfaces, for example, interfaces for peripheral device(s), such as a product board, a mouse, an external memory, and a printer. Additionally, the interface(s) 108 may enable the consistency assessment system 102 to communicate with other devices, such as web servers and external repositories. The interface(s) 108 may also facilitate multiple communications within a wide variety of networks and protocol types, including wired networks, for example, LAN, cable, etc., and wireless networks, such as WLAN, cellular, or satellite. For the purpose, the interface(s) 108 may include one or more ports.

In an implementation, the consistency assessment system 102 includes processor(s) 110 coupled to a memory 112. The processor(s) 110 may be implemented as one or more microprocessors, microcomputers, microcontrollers, digital signal processors, central processing units, state machines, logic circuitries, and/or any devices that manipulate signals based on operational instructions. Among other capabilities, the processor(s) 110 may fetch and execute computer-readable instructions stored in the memory 112.

The memory 112 may include any computer-readable medium known in the art including, for example, volatile memory, such as static random access memory (SRAM), and dynamic random access memory (DRAM), and/or non-volatile memory, such as read only memory (ROM), erasable programmable ROM, flash memories, hard disks, optical disks, and magnetic tapes.

Further, the consistency assessment system 102 includes module(s) 114 and data 116. The module(s) 114 include, for example, a mapping module 118, an analyzing module 120, an assessing module 122, and other module(s) 124. The other module(s) 124 may include programs or coded instructions that supplement applications or functions performed by the consistency assessment system 102.

The data 116 may include product data 126 and other data 128. The other data 128, amongst other things, may serve as a repository for storing data that is processed, received, or generated as a result of the execution of one or more modules in the module(s) 114.

Although the data 116 is shown internal to the consistency assessment system 102, it may be understood that the data 116 can reside in an external repository (not shown in the figure), which may be coupled to the consistency assessment system 102. The consistency assessment system 102 may communicate with the external repository through the interface(s) 108 to obtain information from the data 116.

In an implementation, the consistency assessment system 102 is capable of assessing the consistency of a software product when the software product is in a requirements analysis phase of the development lifecycle of the software product. For example, the consistency assessment system 102 assesses the consistency with reference to the requirements of the software product. For instance, the requirements analysis phase may encompass those tasks that go into determining needs or conditions to meet the requirements for the software product being developed. In addition, the software product requirements describe various functionalities of the software product to achieve a business objective, based on which the software product is developed. Thus, the consistency assessment as described herein makes software development efficient in terms of cost, resources and time used, and also increases the reliability of the software product developed based on the consistency assessment.

As would be understood, requirements influence the overall success of the software product, and according to the present subject matter, inconsistencies in the requirements are determined during the requirements analysis phase of the software product. Therefore, the inconsistencies relating to various parameters defined for the software product are found out with reference to the requirements in initial stages of development. As a result, the software product hence developed achieves good performance with reference to the goals and objectives for which the software product is developed. Thus, the consistency assessment as described herein makes software development efficient in terms of cost, resources and time used, and also increases the reliability of the software product developed based on the consistency assessment.

According to an implementation, the mapping module 118 of the consistency assessment system 102 may obtain a plurality of element categories associated with the software product, during the requirements analysis phase of the software product. The element categories may include, but are not limited to, a 'Goals and Objectives' category, a 'Process and Sub-Process' category, a 'Requirement' category, and a 'Use Case' category.

In one example, the plurality of element categories may be defined by a developer who is responsible for developing the software product. In another example, the plurality of element categories may be pre-defined by the developer. The mapping module 118 can obtain the element categories on previously obtained element categories for a similar software product, stored previously in the product data 126.

Further, the mapping module 118 obtains, for each of the element categories, one or more configuration elements, during the requirements analysis phase of the software product. The configuration elements may be understood as the elements pertaining to the element categories. For example, various requirements associated with the software product can be the elements of the 'Requirement' category.

In an example, for the 'Goals and Objectives' category, the configuration elements can include elements pertaining to goals and objectives to be met for the software product being developed. For example, the configuration elements related to the objectives to be met can include say, an enrollment element according to which users should be automatically enrolled at a point when they initiate a new product.

The 'Process and Sub-Process' category can include configuration elements relating to the abovementioned configuration element in the 'Goals and Objectives' category of the software product, such as an automatic registration element and a bulk registration element, when the users are buying the product. Further, each process may be divided into one or more sub-processes. Accordingly, in the above example, the configuration elements related to the sub-processes of the process configuration elements of bulk registration element can include elements, such as bulk registration for product users and bulk member load registration for workplace users.

Similarly, the 'Requirement' category can include configuration elements pertaining to requirements, corresponding to the processes and sub-processes, which a particular software product must be able to perform to meet the goals and objectives of the software product. In an example, the configuration elements related to requirements can include elements, such as identifying whether the user is already registered or not and generating an activation code for a new user.

Further, the 'Use Case' category can include configuration elements relating to the use cases. The use case is a list of steps, typically defining interactions between a user and a system, to achieve a goal. For example, the configuration elements pertaining to the use cases can include say, activation code generation element. In an implementation, the mapping module 118 may store the element categories and the configuration elements in the product data 126 in the data 116.

In one implementation, the configuration elements may be obtained from both, a client for whom the software product is being developed as well as the developer who is responsible for developing the software product. In another implementation, the configuration elements may be obtained solely from the client or from the developer.

According to an implementation, along with the configuration elements, the mapping module 118 may obtain a plurality of identifiers from a user. The user may be a client for whom the software product is being developed as well as a developer who is responsible for developing the software product. The each of the plurality of identifiers may be indicative of association between the configuration elements. The plurality of identifiers can establish links between the configuration elements. For instance, one or more identifiers can be associated with each configuration element, to indicate the association or dependence of that configuration element with other configuration elements belonging to the same element categories as well as different element categories.

Once the configuration elements and the respective identifiers have been obtained, the mapping module 118 may further generate a configuration structure of the software product under development. The configuration structure of the software product may be generated based on mapping the configuration elements of one element categories to other configuration elements of another element categories based on the identifiers. For instance, the mapping of the configuration elements can be achieved by identifying association between configuration elements in both forward and backward direction.

In an example, based on the identifiers, link between configuration elements of the 'Process and Sub-Process' category and configuration elements of the 'Goals and Objectives' category and the 'Requirements' category may be established. In said example, the identifiers may determine processes and sub-processes to be performed to achieve the particular goal of the software product, the requirements relevant to the determined processes and sub-processes for the software product, and the use cases for analyzing the processes, sub-processes, and requirements.

In addition, the configuration structure can also include configuration elements of the same category mapped to each other based on the identifiers, in addition to being mapped to configuration elements of other categories. In an example, the identifiers may establish link between configuration elements of the 'Goals and Objectives' category. In said example, the identifier may facilitate linkages between the goals to be met for the software product and the objectives corresponding to respective goals. For example, $G_1$ may be linked to $O_{1-1}$. Further, $O_{1-1}$ may then be linked to $P_2$. $P_2$ may be linked to $P_{2-1}$ and $P_{2-2}$, and $P_{2-1}$ and $P_{2-2}$ may be linked to $R_1$, which may further be linked to $UC_1$.

However, since the configuration elements may be received from disjunctive sources, it is possible that the linkages may be missing between the configuration elements. For example, for a configuration element that pertains to goals and objectives, configuration element relating to a process that helps in meeting the goals and objectives of the software product may not be properly defined. In such a case, the linkage between the two configuration elements may be missing.

Figure 1B:
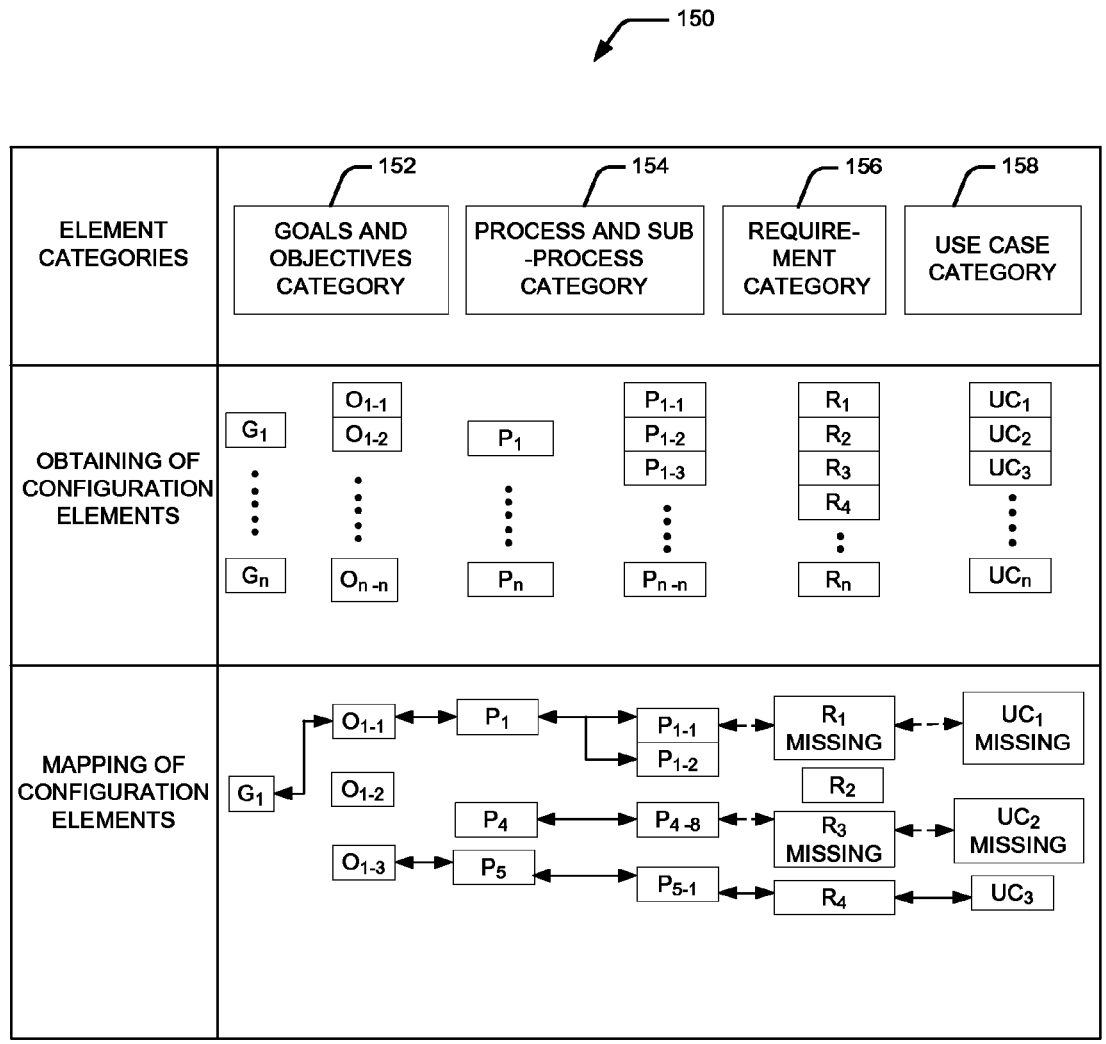
FIG. 1b illustrates a pictorial representation of mapping of configuration elements, in accordance with an embodiment of the present subject matter.

FIG. 1b illustrates a pictorial representation 150 of mapping of configuration elements, in accordance with an embodiment of the present subject matter. As shown in FIG. 1b, block 152 depicts the element category of 'Goals and Objectives' associated with the software product to be developed. As described above, the element categories may be defined by a developer of the software product. Further, a plurality of configuration elements is obtained for the 'Goals and Objectives' category. As shown in FIG. 1b, configuration elements $G_1$ to $G_n$ are obtained related to the goals to be met for the software product and configuration elements $O_{1-1}$ to $_{On-n}$ are obtained corresponding to the goals.

Further, block 154 depicts the 'Process and Sub-Process' category associated with the software product. As can be seen in FIG. 1b, configuration elements obtained for the 'Process and Sub-Process' category include configuration elements $P_1$ to $P_n$ and $P_{1-1}$ to $P_{n-n}$, where the configuration elements $P_1$ to $P_n$ relates to process and the configuration elements $P_{1-1}$ to $P_{n-n}$ relates to sub-processes. Accordingly, $P_1$ and $P_2$ represent processes corresponding to the goals and objectives mentioned above, and $P_{1-1}$, $P_{1-2}$, an$_d$ $P_{1-3}$ represents sub-processes of $P_1$. Similarly, $P_{2-1}$ an$_d$ $P_{2-2}$ represent sub-processes of $P_2$.

Similarly, block 156 represents 'Requirement' category which includes configuration elements pertaining to requirements, say, $R_1$ to $R_n$. Further, block 158 depicts 'Use Case' category. The configuration elements obtained for the 'Use Case' category are represented as $UC_1$ to $UC_n$. Further, as shown in FIG. 1b, configuration elements of the same category are mapped to each other, as well as configuration elements of different categories are mapped to each other. For instance, $G_1$ is mapped to $O_{1-1}$, $O_{1-1}$ is mapped to $P_1$, and $P_1$ is mapped to $P_{1-1}$ and $P_{1-2}$.

Upon generation of the configuration structure, the analyzing module 120 may analyze the configuration structure to determine inconsistencies between the configuration elements associated with the software product. In an example, the inconsistencies may be understood as missing linkages in the configuration structure, i.e., missing linkages between various configuration elements of different element categories in the configuration structure. In said example, in case the configuration elements are not appropriately defined with respect to the software product development, the linkages between the configuration elements may be missing indicating an inconsistency.

In an example, the analyzing module 120 analyzes the configuration structure to determine inconsistencies in requirements defined for the software product. Since poorly defined requirements threaten overall success of the software product, inconsistencies in the requirements should be determined during the requirements analysis phase of the software product. If the inconsistencies in the requirements are found out in initial stages, irrespective that other elements are not properly defined, the software product can be successfully developed. The inconsistencies in requirements may be determined for each process. Details about determining the inconsistencies in requirements are described later in conjunction with FIGS. 2a and 2b.

According to an implementation of the present subject matter, the analyzing module 120 may determine the inconsistencies in the configuration structure based on a traceability analysis. In an example, the traceability analysis can include checking whether each configuration element is mapped with another configuration element in both forward and backward directions. Accordingly, if a configuration element is not mapped with a corresponding configuration element either in one or both the directions, then the configuration element is determined to be inconsistent.

Further, in an implementation, the analyzing module 120 may determine the inconsistencies based on a conservation analysis, for example, in cases where the configuration elements are mapped hierarchically. For instance, for two directly mapped configuration elements, it may be determined whether the configuration element connected in the forward direction correctly achieves a purpose of the other configuration element. If not, then the configuration element connected in the forward direction is determined to be inconsistent.

In an implementation, based on the analysis of the configuration structure and the inconsistency in the requirements, the analyzing module 120 may further obtain a requirement inconsistency matrix (RIM). The RIM may be indicative of total inconsistencies in the configuration structure. The inconsistencies found during the analysis may be populated in the RIM. The RIM may capture information, such as the inconsistency type and direction i.e., forward and backward.

According to an implementation of the present subject matter, the analyzing module 120 may seek feedback from SMEs (subject matter experts) to validate the inconsistencies recorded in the RIM. Based on the feedback or inputs received from the SMEs, the analyzing module 120 may update the RIM.

Further, based on the configuration structure, the assessing module 122 evaluates consistency value for each of the configuration elements. In an example, if for a configuration element, both the traceability and conservation is maintained then the consistency value of the configuration element may be 1. On the contrary, if one of or both the traceability and conservation are not maintained, then the consistency value for the configuration element may be 0.

Further, based upon determination of the RIM, evaluation of the consistency values, eliciting requirements, and additional requirements, the assessing module 122 determines consistency of the software product. The eliciting requirements are the total number of requirements identified for the software product and additional requirements are the total number of missing requirements identified after performing the consistency analysis. For instance, a requirement consistency index can be determined based on the consistency values of the configuration elements, eliciting requirements, and additional requirements. The requirement consistency index (RCI) can be indicative of an overall requirement consistency of the software product. In one implementation, the RCI may be calculated using equation (1) provided below.

$$RCI = \frac{A}{(B+C)} \tag{1}$$

In the above relation, RCI represents the requirement consistency index, A represents total number of consistent requirements, B represents total number of elicited requirements, and C represents total number of additional requirements.

In an implementation, the total number of consistent requirements can be computed by using formula (2) provided below.

$$\sum_{i}^{n} X_i \quad (2)$$

In the above relation, $X_i$ represents consistency value of the $i_{th}$ requirement, n represents number of requirements, and i represents $i_{th}$ requirement.

In an implementation, the assessing module 122 may compute overall Requirement Leakage Index (RLI) to determine the percentage of requirements which were not addressed in the requirements analysis phase. For example, the assessing module 122 may compute the RLI using equation (3) provided below.

$$RLI=1-RCI \quad (3)$$

In the above relation, RLI represents Requirement Leakage Index which in turn is indicative of a requirement inconsistency index, i.e., the no. of inconsistencies in the configuration structure, in contrast to the RCI which, as mentioned previously, represents the no. of consistencies in the configuration structure.

Accordingly, the requirement consistency index (RCI) can be employed to assess the consistency of the software product, the consistencies of the configuration elements, and the software product can be developed based on the same.

Since the product requirements and others parameters associated with the product requirements, such as business goals and product specification, are explicitly defined and considered before development of the software product, the product does not undergo any modification after the development. As a result, the cost associated with product development is significantly mitigated. Also, the association and interaction between the configuration elements are appropriately captured based on the identifiers. Therefore, inconsistencies between the configuration elements can be easily determined and the software product can be developed accordingly.

Figure 2A:
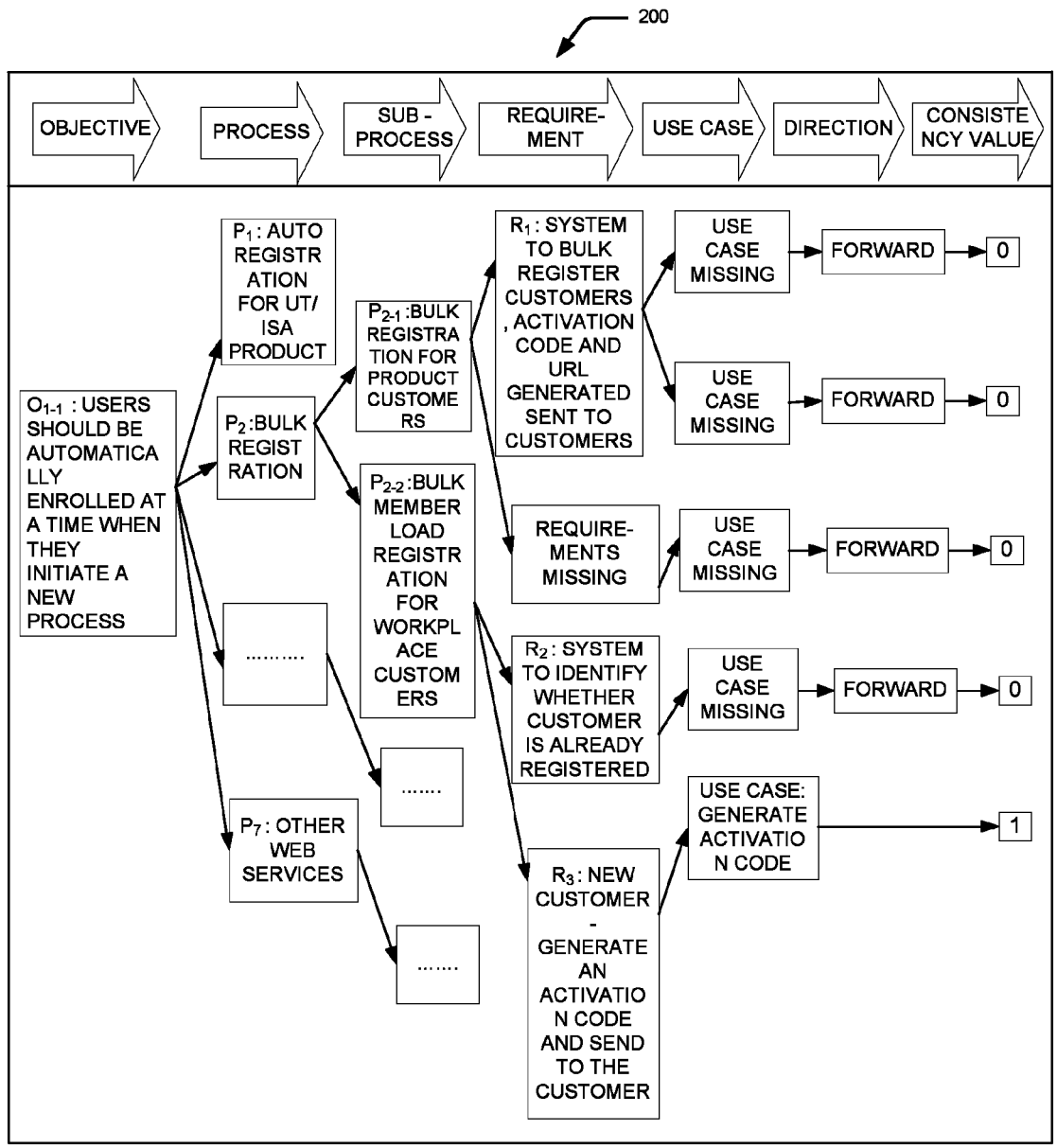
FIG. 2a illustrates an example of consistency assessment, in accordance with an embodiment of the present subject matter.

FIG. 2a illustrates an example 200 of assessment of consistency of a software product to be developed, by the consistency assessment system 102, in accordance with an embodiment of the present subject matter. In said example 200, the software product is to be developed for an electronic registration system for, say a retail transaction establishment, for automatically registering external clients, and maintaining and accessing the accounts. As shown in FIG. 2a, configuration element $O_{1-1}$, pertaining to 'Goals and Objectives' category, is an enrollment element according to which users should be automatically enrolled at a point when they initiate a new process, such as opening a new account. Automatic registration when a customer is buying a software product, registering a customer through internal staffs, and enhancing registration process with a security framework are few examples of the process. Further, the configuration element $O_{1-1}$ is associated with the processes regarding the software product, and the processes are further broken down into the sub-processes. As can be seen in FIG. 2a, the configuration element $O_{1-1}$ is associated with the configuration elements $P_1$ to $P_7$ relating to the processes associated with the software product. For instance, configuration elements $P_1$ is an automatic registration element, configuration elements $P_2$ is a bulk registration element, and configuration elements $P_7$ is other web services element.

Figure 2B:
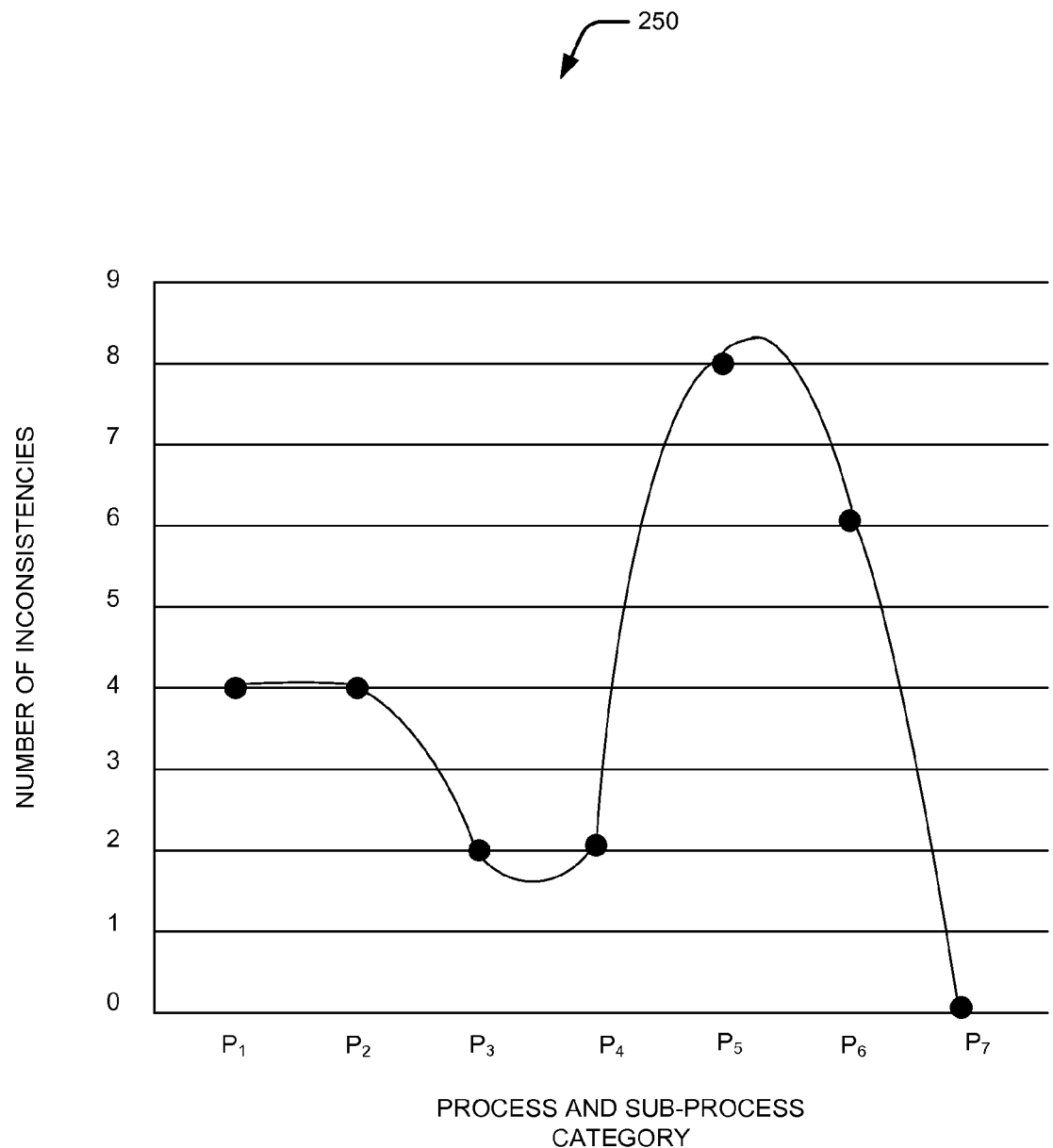
FIG. 2b illustrates a graphical representation depicting inconsistencies, in accordance with an embodiment of the present subject matter.

For instance, in said example 200, the automatic registration may be done when a client buys a product, for example, when the insurance client has enrolled with an insurance product. As depicted in FIG. 2b, the process configuration element $P_2$ is broken to sub-process configuration elements $P_{2-1}$ and $P_{2-2}$ The configuration element $P_{2-1}$ refers to bulk registration for product customers and the configuration element $P_{2-2}$ refers to bulk member load registration for workplace customers. Further, configuration elements associated with requirements and use cases are also obtained, in the same manner as described above.

As indicated earlier, the association between the configuration elements of different categories and of same categories are analyzed to identify inconsistencies in the configuration elements associated with the software product. As shown in FIG. 2a, the configuration elements are linked to each other. It can be seen that configuration elements are not defined properly. For example, requirements are missing for bulk register file upload and generation of activation code.

The analysis of a configuration structure (not shown), generated for the software product to be developed which is the software product for the electronic registration system in this case, is shown in the FIG. 2a. As mentioned previously, the analysis of the configuration structure is done to identify the inconsistencies in the configuration elements. In an implementation, the analysis can be done based on a traceability analysis and conservation analysis. For example, the traceability analysis is done to ascertain whether the configuration elements are mapped to one another in both forward and backward directions. Accordingly, if a configuration element is not mapped with a corresponding configuration element either in one or both the directions, then the configuration element is determined to be inconsistent. The inconsistencies may also be determined based on the conservation analysis, for example, in cases where the configuration elements are mapped hierarchically. For instance, for two directly mapped configuration elements, it may be determined whether the configuration element connected in the forward direction correctly achieves a purpose of the other configuration element.

Accordingly, as is seen from the example 200 of FIG. 2a, the configuration elements $P_{2-1}$ may have to be associated with two requirements for effectively developing the software product; however, as is seen one requirement is identified to be missing, based on the configuration structure and its use case is also missing. Further, if for a configuration element, both the traceability and conservation is maintained then the consistency value of the configuration element may be 1. On the contrary, if one of or both the traceability and conservation are not maintained, then the consistency value for the configuration element may be 0. As can be seen in FIG. 2a, use case is missing for the configuration elements $P_{2-1}$, therefore consistency value is 0.

Further, based on the analysis of the configuration structure and the inconsistency in the requirements, a requirement inconsistency matrix (RIM) is obtained. The inconsistencies found during the analysis are populated in the RIM. According to an aspect, the RIM is depicted in Table 1 (provided below) for the example 200. The RIM may capture information, such as the inconsistency type and direction of inconsistency, i.e., forward and backward.

TABLE 1

| Process | Configuration element X | Configuration element Y | Direction | Type | Analysis | No. of inconsistencies |
| --- | --- | --- | --- | --- | --- | --- |
| $P_2$: Bulk Registration | $P_{2-1}$: Bulk registration for product customer | Requirement | Forward | Trace | 1) Requirement missing regarding security admin tool main menu for Bulk registration as part of security admin tool. | 1 |
| $P_2$: Bulk Registration | $P_{2-1}$: Bulk registration | Requirement | Forward | Conserve | 1) Requirements are not adequately elicited regarding generation of activation code. | 1 |
| $P_2$: Bulk Registration | $R_9$ | Use Case | Forward | Trace | 1) Use Case missing for confirmation and generation of activation code, 2) bulk register file upload, 3) output generation | 3 |

As shown in the Table 1 above, the inconsistencies in the requirements are captured in the RIM, such as the inconsistency type in terms of traceability and conservation, and number of inconsistencies. As mentioned previously, the RIM and the consistency values of the configuration elements are further used for determining the requirement consistency index (RCI) for the software product to be developed. As mentioned previously, the RCI is determined to identify the inconsistencies in the configuration elements and element categories of the software product. Accordingly, the configuration elements can be modified for developing the software product, and the software product, hence, obtained is effective in terms of the various goals and objectives for which it is developed.

FIG. 2b illustrates a graphical representation depicting inconsistencies, in accordance with an embodiment of the present subject matter. As shown in graph 250, number of inconsistencies is plotted on the Y-axis and configuration element P1 to P7 of 'Process and Sub-process' category are plotted on the X-axis. As shown in the graph 250, the number of inconsistencies determined for configuration elements $P_1$ and $P_2$ are 4 and inconsistencies determined for configuration elements $P_3$ and $P_4$ are 2. Similarly, the inconsistencies determined for configuration elements $P_5$, $P_6$ and $P_7$ are 8, 6, and 0, respectively.

Figure 3:
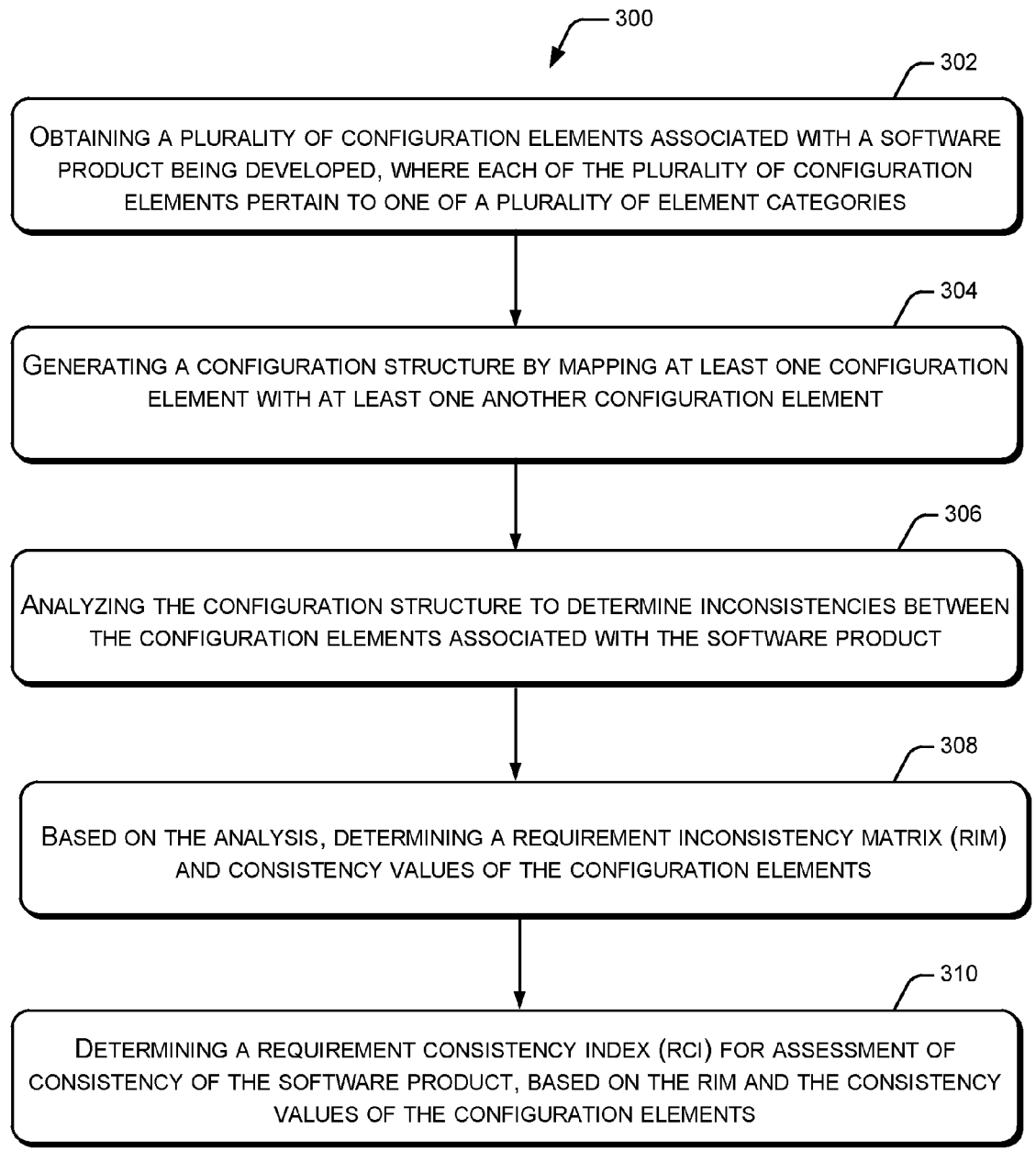
FIG. 3 illustrates a method for assessment of consistency of a software product to be developed, in accordance with the embodiment of the present subject matter.

FIG. 3 illustrates a method 300 for assessment of consistency of a software product, in accordance with the embodiment of the present subject matter.

The method 300 may be described in the general context of computer executable instructions. Generally, computer executable instructions can include routines, programs, objects, components, data structures, procedures, modules, functions, etc., that perform particular functions or implement particular abstract data types. The method 300 may also be practiced in a distributed computing environment where functions are performed by remote processing devices that are linked through a communications network. In a distributed computing environment, computer executable instructions may be located in both local and remote computer storage media, including memory storage devices.

The order in which the method 300 are described is not intended to be construed as a limitation, and any number of the described method blocks can be combined in any order to implement the method 300, or alternative methods. Additionally, individual blocks may be deleted from the methods without departing from the spirit and scope of the subject matter described herein. Furthermore, the method 300 can be implemented in any suitable hardware, software, firmware, or combination thereof.

Referring to FIG. 3, at block 302, the method 300 includes obtaining a plurality of configuration elements associated with a software product being developed, where each of the plurality of configuration elements pertain to one of a plurality of element categories. In an example, the plurality of element categories may be pre-defined by a developer of the software product. The element categories may include, but are not limited to, a 'Goals and Objectives' category, a 'Process and Sub-Process' category, a 'Requirement' category, and a 'Use Case' category. In one implementation, the configuration elements may be obtained from both, a client for whom the software product is being developed as well as the developer of the software product. In another implementation, the configuration elements may be obtained solely from the client or from the developer. According to an implementation, the mapping module 118 of the consistency assessment system 102 obtains the plurality of configuration elements associated for each element category.

At block 304, the method 300 includes generating a configuration structure by mapping at least one configuration element with at least one another configuration element. The configuration elements may be mapped based on one or more identifiers. The identifiers indicate the association or dependence of one configuration element with other configuration elements. Further, the configuration structure is generated by mapping the configuration elements of one element category to other configuration elements of another element category. In addition, the configuration structure can also include configuration elements of the same category mapped to each other. In one implementation, the mapping module 118 generates the configuration structure based on mapping of the configuration elements.

At block 306, the method 300 includes analyzing the configuration structure to determine inconsistencies between the configuration elements associated with the software element.

The inconsistencies may be determined based on a traceability analysis. In an example, the traceability analysis can include checking whether each configuration element is mapped with another configuration element in both forward and backward directions. Accordingly, if a configuration element is not mapped with a corresponding configuration element either in one or both the directions, then the configuration element is determined to be inconsistent.

The inconsistencies may also be determined based on the conservation analysis of the configuration structure, for example, in cases where the configuration elements are mapped hierarchically. For instance, for two directly mapped configuration elements, it may be determined whether the configuration element connected in the forward direction correctly achieves a purpose of the other configuration element. In one implementation, the analyzing module 120 analyzes the configuration structure to determine inconsistencies between the configuration elements.

At block 308, the method 300 includes, based on the analysis done at block 306, determining a requirement inconsistency matrix (RIM) and consistency values of the configuration elements. In an implementation, at block 308, a consistency value for each of the configuration elements is determined. In an example, if for a configuration element, both the traceability and conservation is maintained, then the consistency value of the configuration element may be 1. On the contrary, if one of or both the traceability and conservation are not maintained, then the consistency value for the configuration element may be 0. Further, the RIM may be indicative of total inconsistencies of the configuration elements in the configuration structure. In an example, the RIM is populated with missing linkages or inconsistencies of requirements in both forward and backward directions. According to an implementation, the analyzing module 120 analyzes the configuration structure to determine the RIM and the consistency values of the configuration elements.

At block 310, the method 300 includes determining a requirement consistency index (RCI) for assessment of consistency of the software product, based on the RIM and consistency values of the configuration elements. The requirement consistency index (RCI) can be indicative of an overall requirement consistency of the software product. According to an example, the assessing module 122 determines the RCI based on the equations (1) and (2) described in the previous section.

Although embodiments for methods and systems for assessment of consistency of a software product have been described in a language specific to structural features and/or methods, it is to be understood that the invention is not necessarily limited to the specific features or methods described. Rather, the specific features and methods are disclosed as exemplary embodiments for assessment of consistency of the software product.

We claim:

1. A method, executed by a processor, for assessment of consistency of a software product, the method comprising:
    obtaining a plurality of element categories and a plurality of configuration elements associated with the software product being developed, wherein each of the plurality of configuration elements influences software product development, and wherein each of the plurality of configuration elements pertains to one of the plurality of element categories influencing software product development;
    generating a configuration structure by identifying an association of at least one configuration element of an element category from among the plurality of element categories with at least one other configuration element of at least one other element category from among the plurality of element categories, based on one or more identifiers, wherein the at least one configuration element is associated with the at least one configuration element belonging to same element category or with the at least one configuration element belonging to different element category;
    obtaining a requirement inconsistency matrix (RIM) and a consistency value for each of the plurality of configuration elements by analyzing the configuration structure, wherein the RIM is indicative of inconsistencies in the configuration structure; and
    determining a requirement consistency index (RCI) based on the RIM and the consistency value for each of the plurality of configuration elements for assessment of consistency of the software product, the RCI being indicative of an overall consistency of the software product.

2. The method as claimed in claim 1, wherein the RCI is determined based on at least one of a traceability analysis and a conservation analysis, wherein the traceability analysis comprises determining whether a configuration element is mapped to other configuration element in a forward direction and a backward direction, and wherein the conservation analysis comprises ascertaining whether a configuration element connected in a forward direction, to other configuration element, achieves a purpose of other configuration element.

3. The method as claimed in claim 1, wherein the plurality of element categories comprise a Goals and Objectives category, a Process and Sub-Process category, a Requirement category, and a Use Case category.

4. A consistency assessment system for assessment of consistency of
    a software product comprising:
    a processor;
    a mapping module, coupled to the processor, to,
        obtain a plurality of element categories and a plurality of configuration elements associated with the software product being developed, wherein each of the plurality of configuration elements influences software product development, and wherein each of the plurality of configuration elements pertains to one of the plurality of element categories influencing software product development; and
        generate a configuration structure by identifying, based on one or more identifiers, association of at least one configuration element of an element category from among the plurality of element categories with at least one configuration element of at least one other element category from among the plurality of element categories, wherein the at least one configuration element is associated with the at least one configuration element belonging to same element category or with the at least one configuration element belonging to different element category;
    an analyzing module, coupled to the processor, to,
        obtain a requirement inconsistency matrix (RIM) and a consistency value for each of the plurality of configuration elements by analyzing the configuration structure, wherein the RIM is indicative of inconsistencies in the configuration structure; and
    an assessing module, coupled to the processor, to,
        determine a requirement consistency index (RCI) based on the RIM and the consistency value for each of the plurality of configuration elements for assessment of consistency of the software product, the RCI being indicative of an overall consistency of the software product.

5. The consistency assessment system as claimed in claim 4, wherein the consistency value of 1 is indicative of a consistent configuration element associated with the configuration structure, and wherein the consistency value of 0 is indicative of an inconsistent configuration element associated with the configuration structure.

6. The consistency assessment system as claimed in claim 4, wherein the assessing module determines the RCI based on a traceability analysis, wherein the traceability analysis comprises determining whether a configuration element is mapped to other configuration element in a forward direction and a backward direction.

7. The consistency assessment system as claimed in claim 4, wherein the assessing module determines the RCI based on a conservation analysis, wherein the conservation analysis comprises ascertaining whether a configuration element connected in a forward direction, to other configuration element, achieves a purpose of other configuration element.

8. The consistency assessment system as claimed in claim 4, wherein the plurality of element categories include a Goals and Objectives category, a Process and Sub-Process category, a Requirement category, and a Use Case category.

9. A non-transitory computer-readable medium having embodied thereon a computer program for executing a method comprising:

obtaining a plurality of element categories and a plurality of configuration elements associated with the software product being developed, wherein each of the plurality of configuration elements influences software product development, and wherein each of the plurality of configuration elements pertain to one of the plurality of element categories influencing software product development;

generating a configuration structure by identifying an association of at least one configuration element of an element category from among the plurality of element categories with at least one other configuration element of at least one other element category from among the plurality of element categories, based on one or more identifiers, wherein the at least one configuration element is associated with the at least one configuration element belonging to same element category or with the at least one configuration element belonging to different element category;

obtaining a requirement inconsistency matrix (RIM) and a consistency value for each of the plurality of configuration elements by analyzing the configuration structure, wherein the RIM is indicative of inconsistencies in the configuration structure; and determining a requirement consistency index (RCI) based on the RIM and the consistency value for each of the plurality of configuration elements for assessment of consistency of the software product, the RCI being indicative of an overall consistency of the software product.

10. The non-transitory computer-readable medium as claimed in claim 9, wherein the plurality of element categories include a 'Goal and Objectives' category, a 'Process and Sub-Process' category, a 'Requirement' category, and a 'Use case' category.

* * * * *